United States Patent
Ikeda (10) Patent No.: US 12,126,908 B2
(45) Date of Patent: Oct. 22, 2024

(54) IMAGE CAPTURING APPARATUS OBTAINING A PLURALITY OF IMAGES TO BE USED FOR GENERATION OF A COMBINED IMAGE AND METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Koichiro Ikeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 17/968,010

(22) Filed: Oct. 18, 2022

(65) Prior Publication Data
US 2023/0131656 A1    Apr. 27, 2023

(30) Foreign Application Priority Data
Oct. 27, 2021 (JP) .................... 2021-175905

(51) Int. Cl.
*H04N 23/68* (2023.01)
*H04N 23/73* (2023.01)

(52) U.S. Cl.
CPC ......... *H04N 23/687* (2023.01); *H04N 23/681* (2023.01); *H04N 23/73* (2023.01)

(58) Field of Classification Search
CPC .... H04N 23/687; H04N 23/681; H04N 23/73; H04N 23/6845; H04N 23/685; H04N 23/6812
See application file for complete search history.

(56) References Cited

U.S. PATENT DOCUMENTS

| 2005/0061952 A1* | 3/2005 | Kawahara | H04N 23/68 348/E5.046 |
| 2009/0268041 A1* | 10/2009 | Chou | H04N 23/68 348/208.6 |
| 2009/0290028 A1* | 11/2009 | Yamasaki | H04N 23/68 348/208.1 |
| 2012/0019678 A1* | 1/2012 | Fujita | H04N 23/667 348/208.4 |

FOREIGN PATENT DOCUMENTS

JP    2006-086978 A    3/2006

* cited by examiner

Primary Examiner — Gevell V Selby
(74) Attorney, Agent, or Firm — Cowan, Liebowitz & Latman, P.C.

(57) ABSTRACT

The disclosure provides an image capturing apparatus including an image capturing unit and configured to obtain a plurality of images to be used for generation of a combined image by performing continuous capturing using the image capturing unit, wherein the apparatus comprises a correction unit which detects a shake amount of the image capturing apparatus and performs image blur correction by changing a position of a correction member based on the shake amount; an acquisition unit which acquires a correctable amount representing a degree to which correction by the correction unit is possible from a current position of the correction member and the shake amount; and a decision unit which decides exposure time in next capturing based on a correctable amount acquired by the acquisition unit in a case where capturing for generating the combined image is being performed.

17 Claims, 5 Drawing Sheets

IMAGE CAPTURING APPARATUS OBTAINING A PLURALITY OF IMAGES TO BE USED FOR GENERATION OF A COMBINED IMAGE AND METHOD FOR CONTROLLING THE SAME, AND NON-TRANSITORY COMPUTER-READABLE STORAGE MEDIUM

BACKGROUND OF THE INVENTION

Field of the Invention

The present invention relates to a technique of combining a plurality of captured images.

Description of the Related Art

There is known a technique for generating a combined image with less noise while preventing image blur, by capturing a plurality of images with an exposure time during which image blur does not occur, and combining the images thus captured while modifying a positional deviation of the plurality of images.

For example, Document: Japanese Patent Laid-Open No. 2006-86978 discloses a technique of detecting a shake applied to a lens and setting exposure time on the basis of a detection result of the shake in a camera system that combines a plurality of images obtained by divided exposure of the exposure time having been set.

However, in the method disclosed in this document, the divided exposure time is uniformly set, and therefore in a case where there is a change in a shake state in the middle of capturing of a plurality of images, there is a case where the exposure time is no longer appropriate. For example, the skill for stably holding the camera varies depending on the person, and thus some photographers cannot keep a certain degree of shake during capturing.

SUMMARY OF THE INVENTION

The present invention has been made in view of the above problems, and an object is to provide a technique that can obtain a suitable combined image with less noise and suppressed image blur.

According to an aspect of the invention, there is provided an image capturing apparatus including an image capturing unit and configured to obtain a plurality of images to be used for generation of a combined image by performing continuous capturing using the image capturing unit, the image capturing apparatus comprising: a correction unit configured to detect a shake amount of the image capturing apparatus and perform image blur correction by changing a position of a correction member based on the shake amount; an acquisition unit configured to acquire a correctable amount representing a degree to which correction by the correction unit is possible from a current position of the correction member and the shake amount; and a decision unit configured to decide exposure time in next capturing based on a correctable amount acquired by the acquisition unit in a case where capturing for generating the combined image is being performed, wherein a plurality of images obtained by capturing based on exposure time decided by the decision unit are used for generation of the combined image.

According to the present invention, it is possible to obtain a suitable combined image with less noise and suppressed image blur.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Figure 1:
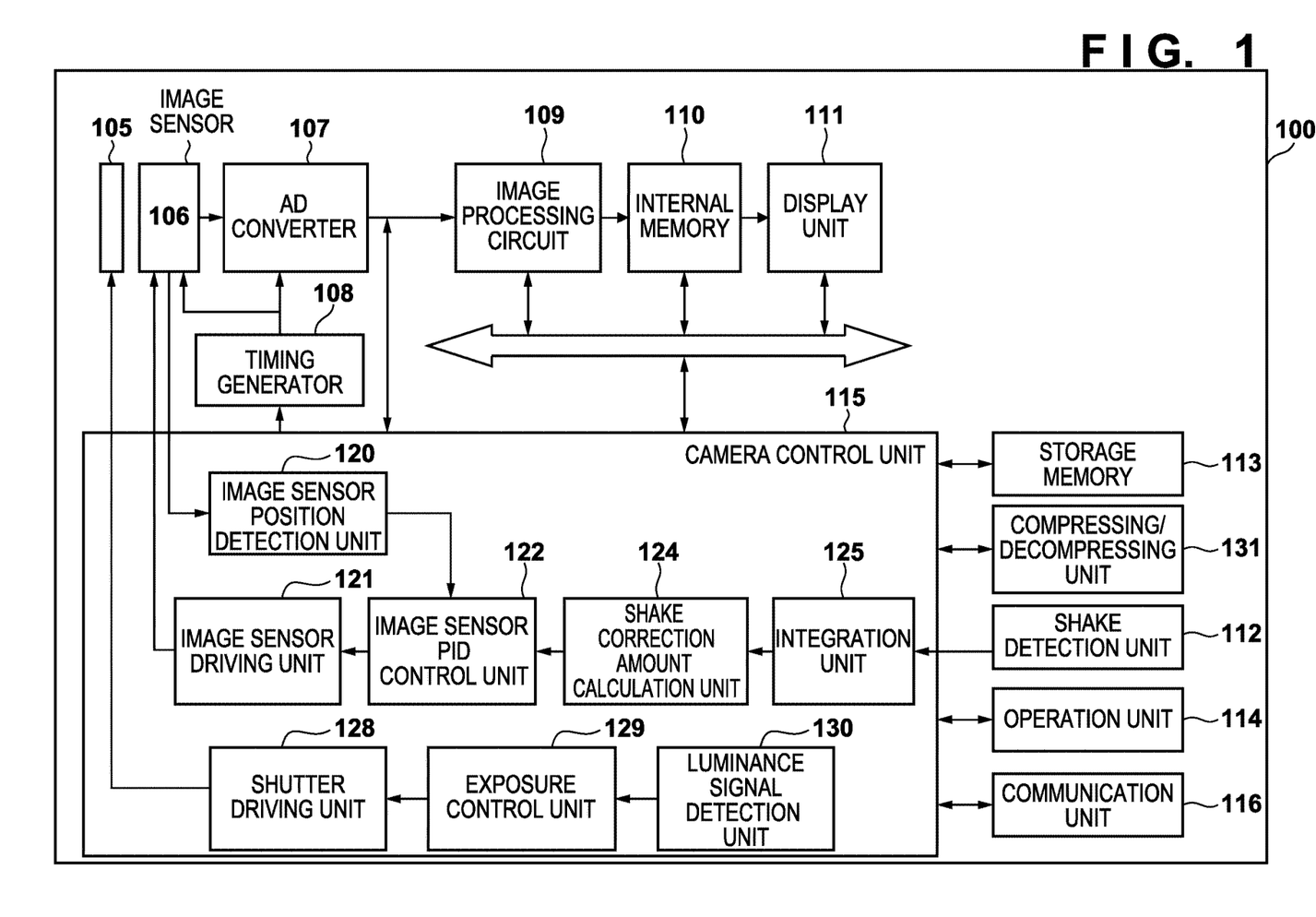
FIG. 1 is a block configuration diagram of an image capturing apparatus in an embodiment.

FIG. 1 is a block diagram illustrating the configuration of an image capturing apparatus 100 in the present embodiment. The image capturing apparatus is typically a digital camera or a digital video camera, but may be an apparatus having an image capturing function, for example, a smartphone, a tablet PC, or the like. FIG. 1 illustrates a lens-interchangeable image capturing apparatus, but the image capturing apparatus may be a lens-integrated image capturing apparatus.

In FIG. 1, a shutter unit 105 is a mechanical focal plane shutter, and includes a front curtain blade and a rear curtain blade. At the time of non-capturing and moving image capturing, the shutter unit 105 moves the front curtain blade and the rear curtain blade to positions retracted from a capturing optical axis, and causes a capturing light flux to pass through to an image sensor 106. At the time of capturing, the shutter unit 105 causes the capturing light flux to pass through by performing exposure traveling in which the front curtain blade moves from a light shielding position to an exposure position. Then, after a set exposure time (shutter second time) has elapsed, the rear curtain blade performs light shielding traveling of moving from the exposure position to the light shielding position, whereby capturing of one piece of image data is completed.

The above is exposure control for adjusting the amount of light using the mechanical front curtain and the mechanical rear curtain of the shutter unit 105. On the other hand, it is also possible to adopt a method of exposure control of an electronic front curtain and a mechanical rear curtain in which electric reset and the rear curtain of the shutter unit 105 are combined.

A subject image formed through a lens-interchangeable or lens-integrated image-capturing optical system is formed on a light receiving surface of the image sensor 106 using a charge coupled device (CCD), a complementary metal-oxide semiconductor (CMOS) sensor, or the like. The image sensor 106 converts the amount of light formed on the light receiving surface into an electric signal. The image sensor 106 in the embodiment has a mechanism that optically corrects image blur by moving in a rotation direction around the optical axis and a direction perpendicular to the optical axis. Note that image blur may be optically corrected by moving a lens included in the image-capturing optical system in a direction perpendicular to the optical axis, or image blur may be corrected by combining the lens and the image sensor 106. The target movement amount of the lens in the case of correcting the image blur using the lens and the target movement amount in the case of correcting the image blur by combining the lens and the image sensor 106 may be decided by a known method. Other known methods may be used as a method of optically correcting image blur. In any case, calculation of the shake correctable amount and decision of the exposure time in accordance with the shake correctable amount may be executed based on the same idea as that in steps S204 and S205 described later.

An AD converter 107 performs noise removal processing, gain adjustment processing, and AD conversion processing on the electric signal output from the image sensor 106. Following a command of a camera control unit 115, a timing generator 108 generates, outputs, and controls signals related to drive timing of the image sensor 106 and output timing of the AD converter 107.

An image processing circuit 109 performs pixel interpolation processing, color conversion processing, and the like on the image data output from the AD converter 107, and then stores the processed image data in an internal memory 110. A display unit 111 displays capturing information and the like together with the image data retained in the internal memory 110. A compressing/decompressing unit 131 performs compressing processing or decompressing processing in accordance with an image format on the data stored in the internal memory 110. A storage memory 113 stores also various data such as parameters. An operation unit 114 is a user interface for the user to perform various menu operations and mode switching operations, and includes various switches, buttons, and a touchscreen.

The camera control unit 115 includes an arithmetic apparatus such as a central processing unit (CPU). Then, the camera control unit 115 executes various control programs stored in the internal memory 110 in accordance with a user operation by the operation unit 114. The control program is a program for performing, for example, image blur correction control, automatic exposure control, automatic focusing control, and the like. In the case of a lens-interchangeable image capturing apparatus, the camera control unit 115 transmits information between the image capturing apparatus and the lens by a communication unit 116.

A shutter driving unit 128 drives the shutter unit 105. A luminance signal detection unit 130 detects, as luminance of a subject and a scene, a signal read from the image sensor 106 and passing through the AD converter 107.

An exposure control unit 129 performs an arithmetic operation on the exposure time, which is one of exposure values, on the basis of the luminance information obtained by the luminance signal detection unit 130 and notifies the shutter driving unit 128 of the arithmetic operation result. The exposure control unit 129 simultaneously performs control of amplifying an image capturing signal read from the image sensor 106. The amplification factor at this time corresponds to the ISO speed, and automatic exposure control (AE control) is performed by adjusting the aperture value of the diaphragm of the image-capturing optical system, the exposure time, and the ISO speed. Note that although details will be described later, the exposure control unit 129 also controls the shutter driving unit 128 on the basis of information from an image sensor position detection unit 120 and a shake detection unit 112.

The shake detection unit 112 detects shake and swing applied to the image capturing apparatus 100. In general, a gyro sensor (hereinafter, simply referred to as gyro) is used as a sensor that detects vibration such as shake and swing, and detects angular velocity of shake and swing.

An image sensor driving unit 121 drives the image sensor 106. The image sensor position detection unit 120 detects the position of the image sensor 106 driven in a direction perpendicular to the optical axis. An image sensor PID control unit 122 performs PID control (proportional control, integral control, derivative control) on the deviation between the target movement amount of the image sensor 106 and the current position detected by the image sensor position detection unit 120. Since PID control is a general technique, detailed description thereof will be omitted.

Next, a method of calculating the target movement amount of the image sensor 106 will be described.

By transforming the angular velocity detected by the shake detection unit 112 into an angle with a dimension raised by one, it becomes possible to control the position of the image sensor 106. As a method of raising the dimension of the angular velocity by one, there is a method of using integration processing by an integration unit 125 or low-pass filter processing (LPF processing), but in the present embodiment, the integration processing is performed.

A shake correction amount calculation unit 124 multiplies the output value of the integration unit 125 by the lens sensitivity information acquired by the communication unit 116 to calculate a target movement amount of the image sensor 106 for correcting image blur. The lens sensitivity information is a value that changes according to the focal length of the lens and the subject distance, and weights the optimum shake correction amount depending on each lens and each lens state.

Next, a method of generating a combined image in the present embodiment will be described.

Figure 2:
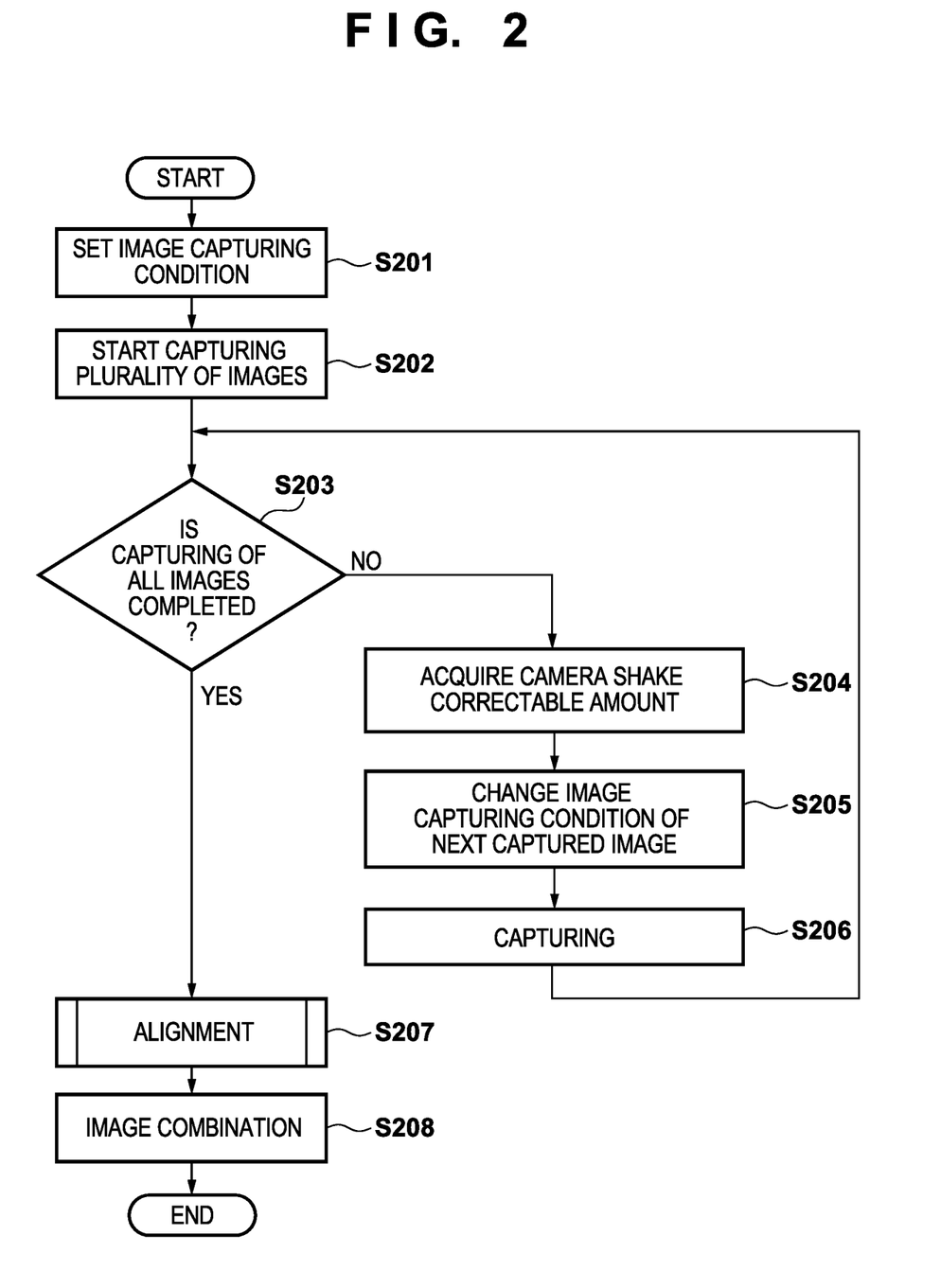
FIG. 2 is a flowchart illustrating a procedure of generation processing of a combined image in an embodiment.

FIG. 2 is a flowchart illustrating generation processing of a combined image in the present embodiment. The combined image generation processing by continuous capturing of the present embodiment is executed in a case where the user operates the operation unit 114 to select the combine mode. The camera control unit 115 executes the program stored in the internal memory 110 and controls the image processing circuit 109 and the like, thereby implementing this combined image generation processing. Note that the processing program may be recorded in a computer-readable recording medium, for example.

First, in S201, the camera control unit 115 sets an image capturing condition such as exposure time for a subject that is capturing target. The image capturing condition set here includes, for example, exposure time without occurrence of camera shake that is obtained in accordance with the focal length of the lens in general.

In S202, the camera control unit 115 starts capturing a plurality of images. Note that the number of images to be captured to create the combined image can be set in advance by the user with the operation unit 114. Here, as an embodiment, the description will be continued on the assumption that four images are captured.

In S203, the camera control unit 115 determines whether or not capturing of all images has been completed. The camera control unit 115 advances the processing to S207 when determining that capturing of the target number (four in the embodiment) is completed, and advances the processing to S204 when determining that the capturing is not completed.

In S204, the camera control unit 115 controls the shake correction amount calculation unit 124 to calculate the shake correctable amount. Note that the calculation of the shake correctable amount will be described later.

In S205, the camera control unit 115 sets the image capturing condition, in accordance with the shake correctable amount calculated in S204, for the subsequent capturing to be performed. Note that the setting of the image capturing condition will be described later.

In S206, the camera control unit 115 controls the image sensor 106 and the exposure control unit 129 to cause them to perform capturing under the image capturing conditions set in S205. The image obtained by the capturing is temporarily stored in the internal memory 110. Then, the camera control unit 115 returns the processing to S203.

After repeating the above processing and storing the target number of images in the internal memory 110, the camera control unit 115 aligns each image stored in the internal memory 110 in S207. Then, in S208, a combined image is generated using the image after the alignment of the camera control unit 115. The generated combined image is stored as an image file in a storage medium not illustrated, for example.

Next, the calculation of the shake correctable amount in step S204, the setting of the image capturing condition in step S205, and the capturing in step S206 in the present embodiment will be described in more detail with reference to FIGS. 3A to 3D.

In FIGS. 3A to 3D, the right direction of the horizontal axis indicates the flow of time, and represents the elapsed time starting from the capturing start time of the first image. The vertical axis represents a temporal change of the driving amount (position) of the image sensor 106 for correcting image blur. A central line of the vertical axis represents the position in a state where the image sensor 106 is not driven (at the drive center position), and lines of the upper end and the lower end represent a position in a state where the image sensor 106 is driven to the limit.

Figure 3A:
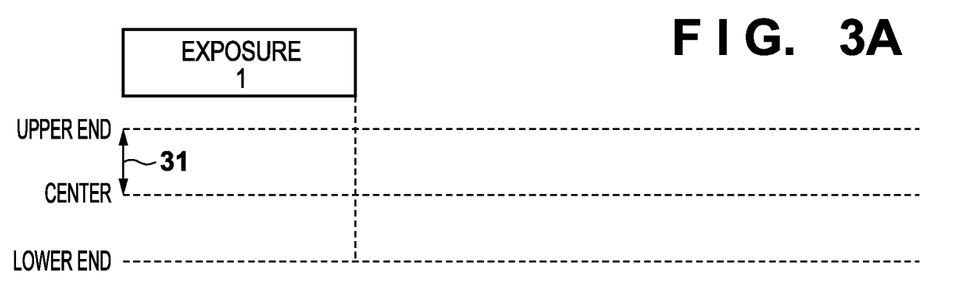
FIGS. 3A to 3D are diagrams for describing calculation of a shake correctable amount and setting of an image capturing condition in an embodiment.

FIG. 3A illustrates a state before starting exposure of the first capturing, and it is assumed that the position of the image sensor 106 at this time is on the center line. The camera control unit 115 calculates the shake correctable amount at this time on the basis of the distance (a shortest distance 31 to the upper end or the lower end) from the current position of the image sensor 106 to the nearest boundary of a movable range of the image sensor 106 and the shake amount detected by the shake detection unit 112. When the shake correctable amount is calculated, the camera control unit 115 changes the first image capturing condition so that the exposure time becomes longer as the shake correctable amount is larger.

Here, the camera control unit 115 calculates a shake correctable amount C using a function f(d, R) with d and R as arguments, where d is the distance between the current position of the image sensor 106 and an end closer to either the upper end or the lower end of the position drivable range, and R is the shake amount detected by the shake detection unit 112. An example of the function f(d, R) is as follows.

$$C = f(d, R) = \alpha \times d - \beta \times R$$

Here, $\alpha$ and $\beta$ are positive coefficients. As shown in the above equation, the shake correctable amount C increases as the distance d increases and the shake amount R decreases. Conversely, the shake correctable amount C decreases as the distance d decreases and the shake amount R increases.

Note that the shake correctable amount C may be obtained by referring to a table corresponding to the function f(d, R).

Figure 3B:
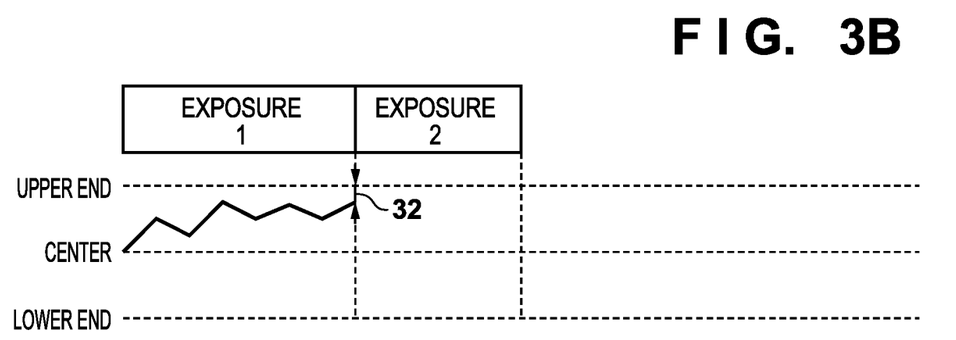

FIG. 3B illustrates a state before starting exposure of the second capturing, and the image sensor 106 is at a position close to the upper end. In this case, since a distance 32 from the image sensor 106 to the upper end is small and there is no margin for performing shake correction, the calculated shake correctable amount becomes small. As a result, the camera control unit 115 changes the second image capturing condition so as to shorten the exposure time.

Figure 3C:
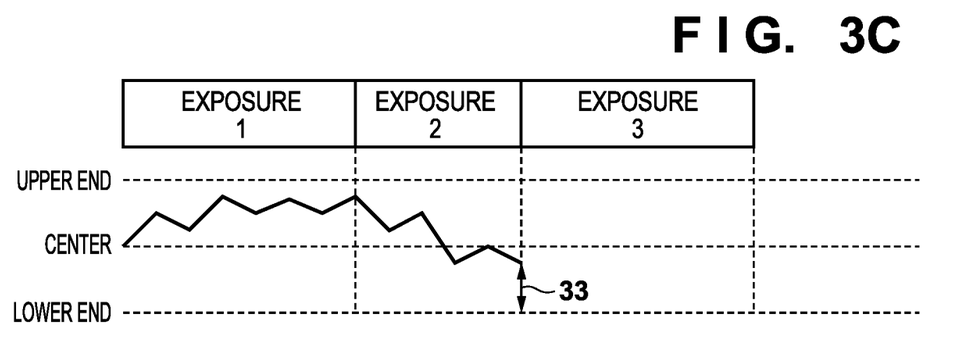
Figure 3D:
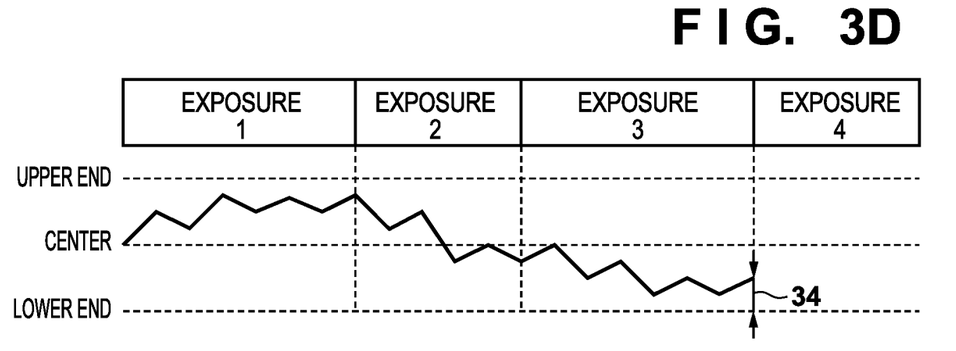

FIG. 3C illustrates a state before exposure of the third capturing, FIG. 3D illustrates a state before starting exposure of the fourth capturing, and each image capturing condition is determined by a similar manner to those described above.

A specific example of the above is presented below. Let the exposure time set in S201 be Ts. The maximum value of the shake correctable amount C is defined as Cmax, and the minimum value is defined as Cmin.

In this case, in S205, the camera control unit 115 decides exposure time T according to the following equation, for example, on the basis of the exposure time Ts set in S201.

$$T = Ts + \{C - C\max\}$$

According to the above equation, as the shake correctable amount C is larger (closer to Cmax), the exposure time T approaches the exposure time Ts set in S205. On the other hand, the smaller (the closer to Cmin) the shake correctable amount C is, the smaller the exposure time T becomes (however, T>0 is satisfied).

Note that in a case where the subject to be captured is a moving object, if the exposure time is made longer than necessary, the degree of image blur of the moving object tends to increase. Therefore, when the presence of the moving object is detected, the upper limit of the exposure time set by the camera control unit 115 may be made small as compared with the case where the moving object is not present. The exposure time T may be selected according to the shake correctable amount C from a plurality of preset exposure times. For example, with the exposure time Ts set to a first exposure time, and an exposure time shorter than the exposure time Ts by a predetermined time set to a second exposure time, the first exposure time may be selected when the shake correctable amount C is equal to or more than the threshold, and the second exposure time may be selected when the shake correctable amount C is less than the threshold. The upper limit value and the lower limit value may be set such that the exposure time falls within a predetermined range so that the exposure time of each image does not become extremely different. After the exposure time is decided as described above, at least the ISO speed is set based on the luminance information. If the user does not manually set an aperture value, the aperture value is set together with the ISO speed. A known method is only required to be used as a method of setting the ISO speed and the aperture value on the basis of the luminance information.

Next, the alignment processing in S207 will be described. Note that in the case of performing the present processing, the target number of images have already been acquired. Hereinafter, a description will be given with reference to the flowchart of FIG. 4.

Figure 4:
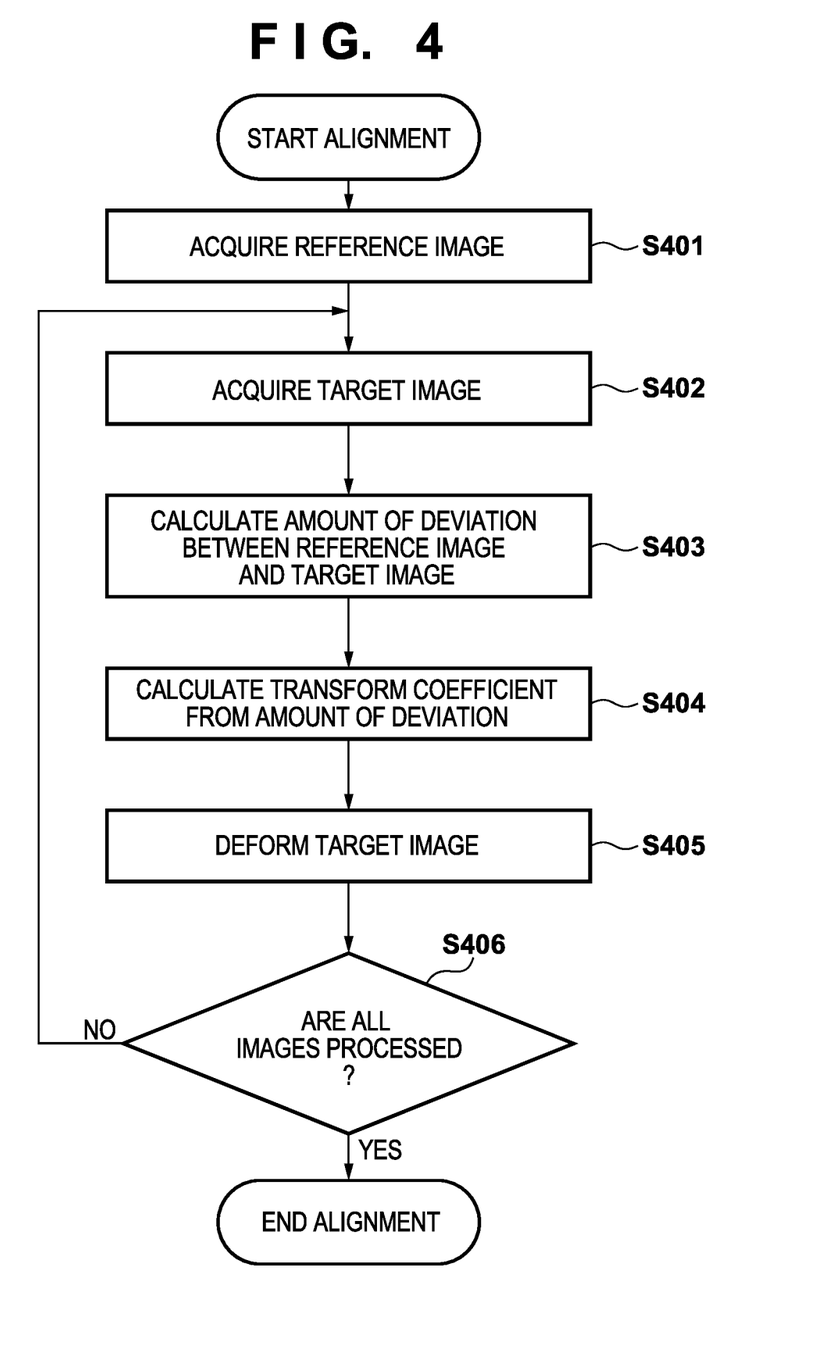
FIG. 4 is a flowchart illustrating a procedure of alignment processing in an embodiment.

In S401, the image processing circuit 109 acquires a reference image for alignment from each of the images stored in the internal memory 110. The reference image for alignment is assumed to be the earliest one in capturing order, for example. Then, images other than the reference image are set as a correction target images.

Next, in S402, the image processing circuit 109 acquires one correction target image for the alignment processing. It is assumed that the correction target image is an image other than the reference image acquired in S401 and has not been subjected to the alignment processing. When the reference image is the image being the earliest one in capturing order, the image processing circuit 109 is only required to sequentially acquire the correction target images in the capturing order.

In S403, the image processing circuit 109 calculates the amount of positional deviation between the reference image and the correction target image. An example of a calculation method will be described below.

First, the image processing circuit 109 sets a plurality of blocks for the reference image. Here, it is preferable to set the size of each block to be the same. Next, the image processing circuit 109 sets a range wider than the block of the reference image as a search range at the same position as each block of the reference image in the correction target image. Finally, the image processing circuit 109 calculates, in each search range of the correction target image, a corresponding point (or position) at which the sum of absolute difference (SAD) in luminance from the block of the reference image becomes minimum. The image processing circuit 109 calculates, as a vector, a positional deviation between the corresponding point and the center of the block of the reference image. In the calculation of the corresponding point described above, the image processing circuit 109 may use the sum of squared difference (SSD), normalized cross correlation (NCC), and the like other than the SAD.

In S404, the image processing circuit 109 calculates a transform coefficient from the amount of positional deviation between the reference image and the target image. The image processing circuit 109 uses, for example, a projective transform coefficient as the transform coefficient. However, the transform coefficient is not limited to only the projective transform coefficient, and a simplified transform coefficient only including an affine transform coefficient or a horizontal/vertical shift may be used.

In S405, the image processing circuit 109 performs transform on the correction target image using the transform coefficient calculated in S404, and generates a corrected image in which the amount of deviation is corrected.

For example, the image processing circuit 109 can deform the target image according to the following equation (1) to generate a corrected image I'.

[Equation 1]
$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad (1)$$

In the equation (1), (x', y') represents coordinates after deformation, and (x, y) represents coordinates before deformation. A matrix A represents the deformation coefficient calculated by the image processing circuit 109 in S404.

In S406, the image processing circuit 109 determines whether or not alignment has been performed on all the images other than the reference image. When determining that the alignment has been performed on all the images other than the reference image, the image processing circuit 109 ends the processing illustrated in the flowchart. When determining that there is an unprocessed image, the image processing circuit 109 returns the processing to S402.

As described above, when the alignment processing is completed for all the plurality of captured images, image combination processing of S208 is performed.

In the image combination processing, image combination of the reference image and a plurality of corrected images, other than the reference image is performed, subjected to alignment processing. Here, the image combination processing is performed by performing arithmetic mean of signals of corresponding coordinates of each image, and random noise in the image is reduced by performing arithmetic mean.

Figure 5:
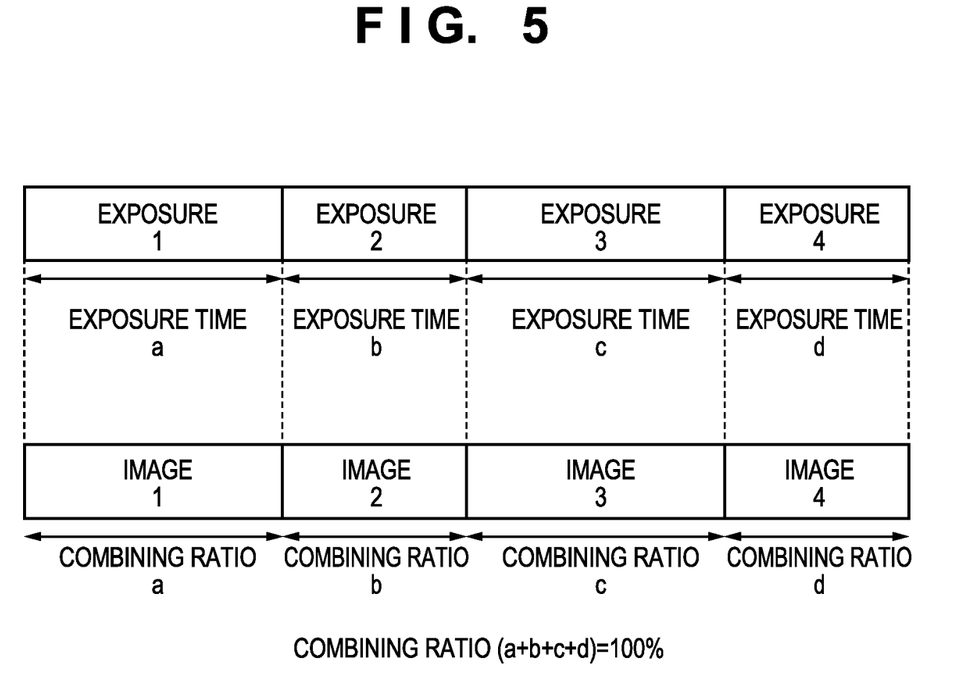
FIG. 5 is a diagram for describing a method of setting a combining ratio in an embodiment.

The combining ratio of each image corresponds to the exposure time of each image. In the present embodiment, as illustrated in FIG. 5, the combining ratio is set to become higher as the image is captured with a longer exposure time. Due to this, since the combining ratio of the image with less random noise becomes relatively high, noise of the combined image can be reduced. In a case where the exposure time is equal, the combining ratio of each image is set to be uniform. Note that the method of deciding the combining ratio is not limited to this, and another method may be used as long as the random noise of the combined image is minimized.

Although preferred embodiments of the present invention have been described above, the present invention is not limited to such embodiments, and various modifications and changes can be made within the scope of the gist. The above embodiment has a configuration in which the ISO speed is decided on the basis of the exposure time and the luminance information, and the image combining ratio is set according to the exposure time on the assumption that the ISO speed decreases as the exposure time increases as long as the luminance is the same. However, since an image with higher ISO speed has a larger influence of random noise, the combining ratio of the image may be set according to the ISO speed (the lower the ISO speed is, the larger the combining ratio is made).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-175905, filed Oct. 27, 2021, which is hereby incorporated by reference herein in its entirety.

What is claimed is:

1. An image capturing apparatus including an image capturing unit and configured to obtain a plurality of images to be used for generation of a combined image by performing continuous capturing using the image capturing unit, the image capturing apparatus comprising:
   a processor; and
   a memory storing instructions which, when read and executed by the processor, cause the processor to function as:
   a correction unit configured to detect a shake amount of the image capturing apparatus and perform image blur correction by changing a position of a correction member based on the shake amount;
   an acquisition unit configured to acquire a correctable amount representing a degree to which correction by the correction unit is possible from a current position of the correction member and the shake amount;
   a decision unit configured to decide exposure time in next capturing based on a correctable amount acquired by the acquisition unit in a case where capturing for generating the combined image is being performed; and
   a combining unit configured to obtain a vector representing a deviation amount between a reference image and one correction target image, the reference image being one preset image in the plurality of images and the correction target images being remaining images in the plurality of images other than the one preset image, and to execute generating, for the remaining images, a correction image by correcting a position of a pixel of the one correction target image according to the vector,
   wherein a plurality of images obtained by capturing based on exposure time decided by the decision unit are used for generation of the combined image, and
   wherein the combining unit combines the reference image and the correction image according to a ratio of exposure times of each of the reference image and the correction target image.

2. The apparatus according to claim 1, wherein
the acquisition unit calculates the correctable amount based on a distance from a nearest boundary of a movable range of the correction member and the shake amount.

3. The apparatus according to claim 1, wherein
the decision unit decides such that exposure time is made small as the correctable amount is smaller.

4. The apparatus according to claim 1, wherein
the combining unit increases a combining ratio as an image has a longer exposure time.

5. The apparatus according to claim 1, wherein
the correction member is an image sensor included in the image capturing unit.

6. The apparatus according to claim 1, wherein
the correction member is a lens included in an image-capturing optical system.

7. The apparatus according to claim 1, wherein
the decision unit decides ISO speed based on luminance information and decided exposure time.

8. A method of controlling an image capturing apparatus including an image capturing unit and configured to obtain a plurality of images to be used for generation of a combined image by performing continuous capturing using the image capturing unit, the method comprising:
   (a) detecting a shake amount of the image capturing apparatus and performing image blur correction by changing a position of a correction member based on the shake amount;
   (b) acquiring a correctable amount representing a degree to which correction in the step (a) is possible from a current position of the correction member and the shake amount; and
   (c) deciding exposure time in next capturing based on a correctable amount acquired in the step (b) in a case where capturing for generating the combined image is being performed,
   wherein a plurality of images obtained by capturing based on exposure time decided in the step (c) are used for generation of the combined image,
   (d) obtaining a vector representing a deviation amount between a reference image and one correction target image, the reference image being one preset image in the plurality of images and the correction target images being remaining images in the plurality of images other than the one preset image,
   (e) generating, for the remaining images, a correction image by correcting a position of a pixel of the one correction target image according to the vector, and
   (f) combining the reference image and the correction image according to a ratio of exposure times of each of the reference image and the correction target image.

9. The method according to claim 8, wherein
in the step (b), the correctable amount is calculated based on a distance from a nearest boundary of a movable range of the correction member and the shake amount.

10. The method according to claim 8, wherein
in the step (c), it is decided such that exposure time is made small as the correctable amount is smaller.

11. The method according to claim 8, wherein
in the combining, a combining ratio increases as an image has a longer exposure time.

12. The method according to claim 8, wherein
in the step (c), ISO speed is decided based on luminance information and decided exposure time.

13. A non-transitory computer-readable storage medium storing a program which, when read and executed by a computer, causes the computer to execute the steps of a method of controlling an image capturing apparatus including an image capturing unit and configured to obtain a plurality of images to be used for generation of a combined image by performing continuous capturing using the image capturing unit, the method comprising:
   (a) detecting a shake amount of the image capturing apparatus and performing image blur correction by changing a position of a correction member based on the shake amount;
   (b) acquiring a correctable amount representing a degree to which correction in the step (a) is possible from a current position of the correction member and the shake amount; and (c) deciding exposure time in next capturing based on a correctable amount acquired in the step (b) in a case where capturing for generating the combined image is being performed, wherein a plurality of images obtained by capturing based on exposure time decided in the step (c) are used for generation of the combined image, (d) obtaining a vector representing a deviation amount between a reference image and one correction target image, the reference image being one preset image in the plurality of images and the correction target images being remaining images in the plurality of images other than the one preset image, (e) generating, for the remaining images, a correction image by correcting a position of a pixel of the one correction target image according to the vector, and (f) combining the reference image and the correction image according to a ratio of exposure times of each of the reference image and the correction target image.

14. The medium according to claim 13, wherein in the step (b), the correctable amount is calculated based on a distance from a nearest boundary of a movable range of the correction member and the shake amount.

15. The medium according to claim 13, wherein in the step (c), it is decided such that exposure time is made small as the correctable amount is smaller.

16. The medium according to claim 13, wherein in the combining, a combining ratio increases as an image has a longer exposure time.

17. The medium according to claim 13, wherein in the step (c), ISO speed is decided based on luminance information and decided exposure time.

* * * * *